US009414327B2

(12) United States Patent
Panchal et al.

(10) Patent No.: US 9,414,327 B2
(45) Date of Patent: Aug. 9, 2016

(54) METHOD AND APPARATUS OF FRACTIONAL POWER CONTROL IN WIRELESS COMMUNICATION NETWORKS

(75) Inventors: Jignesh Shantilal Panchal, Somerset, NJ (US); Neil E. Bernstein, Cedar Knolls, NJ (US); Devesh T. Patel, Hillsborough, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 816 days.

(21) Appl. No.: 13/153,882

(22) Filed: Jun. 6, 2011

(65) Prior Publication Data

US 2012/0307745 A1    Dec. 6, 2012

(51) Int. Cl.
*H04W 52/24* (2009.01)
*H04W 52/12* (2009.01)
*H04W 52/14* (2009.01)
*H04W 52/32* (2009.01)

(52) U.S. Cl.
CPC .......... *H04W 52/243* (2013.01); *H04W 52/242* (2013.01); *H04W 52/12* (2013.01); *H04W 52/146* (2013.01); *H04W 52/241* (2013.01); *H04W 52/246* (2013.01); *H04W 52/247* (2013.01); *H04W 52/248* (2013.01); *H04W 52/325* (2013.01)

(58) Field of Classification Search
None
See application file for complete search history.

(56) References Cited

U.S. PATENT DOCUMENTS

| | | | | |
|---|---|---|---|---|
| 8,340,593 | B2* | 12/2012 | Yang et al. | 455/69 |
| 8,422,956 | B2* | 4/2013 | Narasimha et al. | 455/63.1 |
| 8,437,794 | B2* | 5/2013 | Weaver et al. | 455/522 |
| 2006/0211441 | A1* | 9/2006 | Mese et al. | 455/522 |
| 2008/0166976 | A1* | 7/2008 | Rao | 455/69 |

FOREIGN PATENT DOCUMENTS

WO   PCT/US2012/040646      7/2012

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 V8.2.0 (Mar. 2008), Technical Specification, Valbonne, France, http://www.3gpp.org, pp. 1-30.

(Continued)

*Primary Examiner* — Hong Cho
(74) *Attorney, Agent, or Firm* — Chiesa Shahinian & Giantomasi, PC (57) ABSTRACT

A method is provided for dynamically updating the fractional power control (FPC) parameters of a wireless network such as an LTE network, so that system performance can be improved in a variety of different loading conditions, particularly under conditions of moderate or light loading. An exemplary embodiment includes obtaining a current value of a time-varying uplink interference figure for at least one individual sector s. For at least one such sector s, a value is selected for at least one FPC parameter, thereby to determine a dependency of the target SINR $\hat{\gamma}(k,s)$ on the path loss $\lambda(k,s)$ for each UE k in sector s for which $\hat{\gamma}(k,s)$ falls between a maximum target $\hat{\gamma}_{max}$ and a minimum target $\hat{\gamma}_{min}$. The selecting step is responsive to the obtained interference figure, such that at least one FPC parameter.

21 Claims, 5 Drawing Sheets

(56) References Cited

OTHER PUBLICATIONS

Anil M. Rao Ed—Miguel Garcia De La Fuente et al.: "Reverse Link Power Control for Managing Inter-Cell Interference in Orthogonal Multiple Access Systems", Vehicular Technology Conference, 2007. VTC-2007 Fall. 2007 IEEE 66TH, IEEE, PI, Sep. 1, 2007, pp. 1837-1841, XP031147725, ISBN: 978-1-4244-0263-2 abstract page 1838, left-hand column, lines 4-10, 22-24, paragraph I; paragraph [II.B]; paragraph [0III]; paragraph [00IV]; paragraph [000V].

Nortel: "UL Power Control with Fractional Frequency Reuse for E-UTRA", 3GPP Draft; R1-072373 (NORTEL-UL_PC_FFR), 3rd Generation Partnership Project (3GPP), Mobile Competence Centre; 650 Route Des Lucioles; F-06921 Sophia-Antipolis Cedex; France, vol. RAN WG1, no. Kobe, Japan; XP050106101, [retrieved on May 2, 2007], the whole document.

* cited by examiner

METHOD AND APPARATUS OF FRACTIONAL POWER CONTROL IN WIRELESS COMMUNICATION NETWORKS

FIELD OF THE INVENTION

The invention relates to power control in wireless communication networks, and more particularly to LTE and other network technologies that employ frequency-division multiple access (FDMA).

ART BACKGROUND

Co-channel interference is often experienced in cellular networks. It is an undesirable phenomenon that tends to limit radiofrequency (RF) coverage in portions of the RF spectrum that are shared by neighboring sectors or cells. (Hereinafter, the terms "sector" and "cell" will be used interchangeably.)

In LTE and other technologies that are based on FDMA, it is prohibited for any two mobile user terminals within the same cell to simultaneously use the same frequency or set of frequencies, unless multiuser MIMO techniques are being used. (Hereinafter, we will use the term "user equipment", i.e., "UE", to refer to a mobile user terminal, and we will use the term "base station" interchangeably with the term "NodeB".) As a consequence, all of the co-channel interference experienced in LTE (and in certain other network technologies) is contributed by activity from the neighboring sectors.

In particular, the uplink (UL) interference perceived by a given sector is due to the UEs that are active in the neighboring sectors. In the nomenclature of LTE, a metric referred to as Interference over Thermal (IoT) is used to quantify the interference level.

A precise definition of IoT involves the thermal noise floor $n_p$ over the bandwidth of a physical resource block (PRB), which is the basic unit of time-bandwidth resources that are allocated to the air interface in LTE. The bandwidth of a PRB is generally taken to be 180 kHz. Assuming a typical thermal noise density of –174 dBm/Hz and a typical receiver noise figure of 4 dB, a typical value of $n_p$ is –118 dBm.

IoT is defined with reference to a given sector s, a given PRB having index m, and a given subframe having index j. The k'th interfering UE contributes a received interference power $p_{m,j}^r(k,s)$ related to the power $p_{m,j}^t(k,s)$ transmitted by UE k according to:

$$p_{m,j}^r(k,s) = p_{m,j}^t(k,s) \cdot \rho_{m,j}(k,s),$$

where $\rho_{m,j}(k,s)$ is the link gain on PRM m in subframe j from the interfering UE k to the sector s.

Accordingly, a wideband IoT, averaged over the entire operating bandwidth, is defined by:

$$IoT(j, s) = \frac{\sum_{m=1}^{M} \sum_{k} p_{m,j}^r(k, s) + (M \cdot n_p)}{M \cdot n_p},$$

where the inner summation is taken over all interfering UEs and the outer summation is taken over the bandwidths of the full number M of PRBs. (In a 10-MHz LTE channel, for example, M=50.)

Often, it will be advantageous to time-average the above figure to obtain an average value $IoT_{avg}$ using, e.g., a single pole IIR filter with an appropriate time constant as the averager.

It is common for networks to operate in the interference-limited regime, where IoT is relatively high. Under such conditions, increasing the uplink transmit power does not generally improve spectral efficiency or system performance. Instead, the SINR levels seen on the uplinks by the base stations in neighboring sectors are pushed down with increasing IoT, driving the UEs in the neighboring sectors to increase their own transmit powers. The resulting increase in interference pushes SINR levels back down in the original sector.

Several techniques have been developed in response to the challenges posed by inter-sector cochannel interference. These include the use of upper limits on the transmit power, static frequency reuse, and soft fractional frequency reuse. Another known technique is Inter-cell Interference Control (ICIC), which typically calls for communication and feedback between base stations over the X2 interface and active load sharing between sectors. Each of these techniques has advantages and disadvantages. One disadvantage of ICIC, for example, is a relatively high level of complexity.

Another known technique of interference management is Fractional Power Control (FPC). Because FPC is managed independently within each sector, it is generally less complex than ICIC. FPC operates in an outer power control loop for uplink transmissions. In LTE, it applies to the Physical Uplink Shared Channel (PUSCH).

Very briefly, an inner power control loop steps the uplink transmit power up or down in an effort to match the actual signal-to-noise-and-interference ratio (SINR) to a target SINR. The target SINR is set in the outer power control loop, which operates on a slower time scale than the inner loop. Typically, the target SINR is computed in a modem card at the NodeB.

According to the FPC technique, the target SINR for a given UE is less, the closer the UE is to the cell edge. More precisely, the target SINR varies between a maximum and a minimum value. Between those limits, the target SINR depends on the path loss that has been estimated for the given UE. As the path loss increases, the target SINR is reduced.

Such an approach is generally useful for mitigating interference effects, because on average, it accepts a relatively low SINR from the UEs nearest the cell edge. As a consequence, the inner control loop forces the transmit power of those UEs toward a relatively low value. Because the UEs nearest the cell edge are the most potent potential interferors, managing their transmit power in such a manner tends to reduce intercell interference.

A set of parameters determine how fast the target SINR will roll off as the path loss of a given UE increases. Conventionally, these parameters are static, and as a consequence are typically set in anticipation of high loading conditions in which the IoT is also relatively high. What is lacking is greater flexibility to optimize the FPC parameters.

SUMMARY OF THE INVENTION

We have found a method for dynamically updating the FPC parameters so that system performance can be improved in a variety of different loading conditions, particularly under conditions of moderate or light loading.

Generally, the outer power control loop sets a target SINR $\hat{\gamma}(k,s)$ for a UE k in a sector s, wherein k and s are positive integer indices, which depends on a path loss $\lambda(k,s)$ between UE k and a NodeB serving sector s. The FPC parameters comprise a maximum SINR target $\hat{\gamma}_{max}$, a minimum SINR target $\hat{\gamma}_{min}$, and a parameter $\alpha$ that determines how rapidly the target SINR will vary with path loss over a range spanning at least some path loss values.

Accordingly, in one embodiment of the invention, a method of uplink power control in a wireless network includes obtaining a current value of a time-varying uplink interference figure for at least one individual sector s. For at least one said individual sector s, a value is selected for at least one of $\hat{\gamma}_{max}, \hat{\gamma}_{min}$, and $\alpha$, thereby to determine a dependency of $\hat{\gamma}(k,s)$ on the path loss $\lambda(k,s)$ for each UE k in sector s for which $\hat{\gamma}(k,s)$ falls between $\hat{\gamma}_{max}$ and $\hat{\gamma}_{min}$. The selecting step is responsive to the obtained interference figure, such that at least one of $\hat{\gamma}_{max}, \hat{\gamma}_{min}$, and $\alpha$ depends on said figure.

In an embodiment, the selecting step comprises mapping the interference figure to the selected value or values according to a specified range within which the interference figure falls.

In an embodiment, $\hat{\gamma}(k,s)$ depends linearly on $\lambda(k,s)$ over a range between $\hat{\gamma}_{max}$ and $\hat{\gamma}_{min}$, and the linear dependence has a slope defined by $\alpha$. Here, $\gamma(k,s)$ and $\lambda(k,s)$ are both expressed in decibels. In other embodiments, the path-loss dependence of the target SINR may be non-linear.

In an embodiment, the interference figure characterizes uplink interference within sector s due to transmissions from other sectors.

In an embodiment, the interference figure characterizes uplink interference in other sectors due to transmissions from sector s.

DETAILED DESCRIPTION

Figure 1:
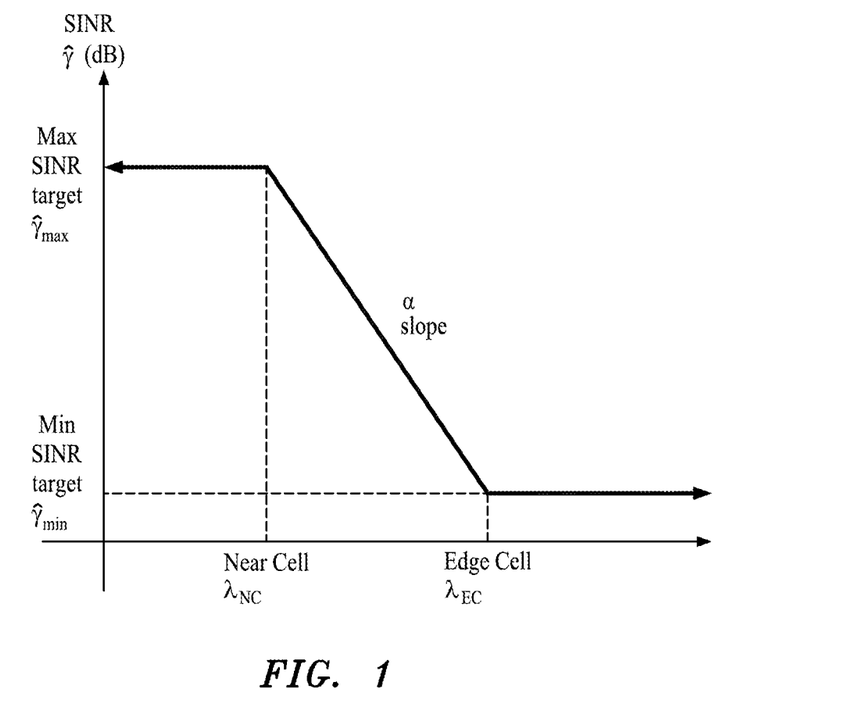
FIG. 1 is a plot showing the functional relationship between IoT and cell loading, and illustrating the steep rise in IoT with incremental increases in loading when the cell is already heavily loaded.

FIG. 1 shows a typical plot of IoT (in decibels) as a function of cell loading (as a percentage value). Cell loading is defined as total interference, expressed as a fraction (or percentage) of the sum of interference plus thermal noise. Accordingly, the loading approaches 100% when the loading becomes dominant, and the thermal noise becomes insignificant in comparison.

In the conventional practice of FPC, the (fixed) FPC parameters are typically set to a worst case level in which the interfering power generated within one cell results in an IoT level of 5-10 dB in neighboring cells. As seen from FIG. 1, such an IoT level would be expected to obtain when the cell is heavily loaded, i.e., experiencing a loading of 70%-90%.

Our new approach is advantageous because the cell loading will often be light or moderate. Because our approach permits the FPC parameters to be updated dynamically, it provides more freedom to optimize the performance of the system under a range of loading conditions.

Figure 2:
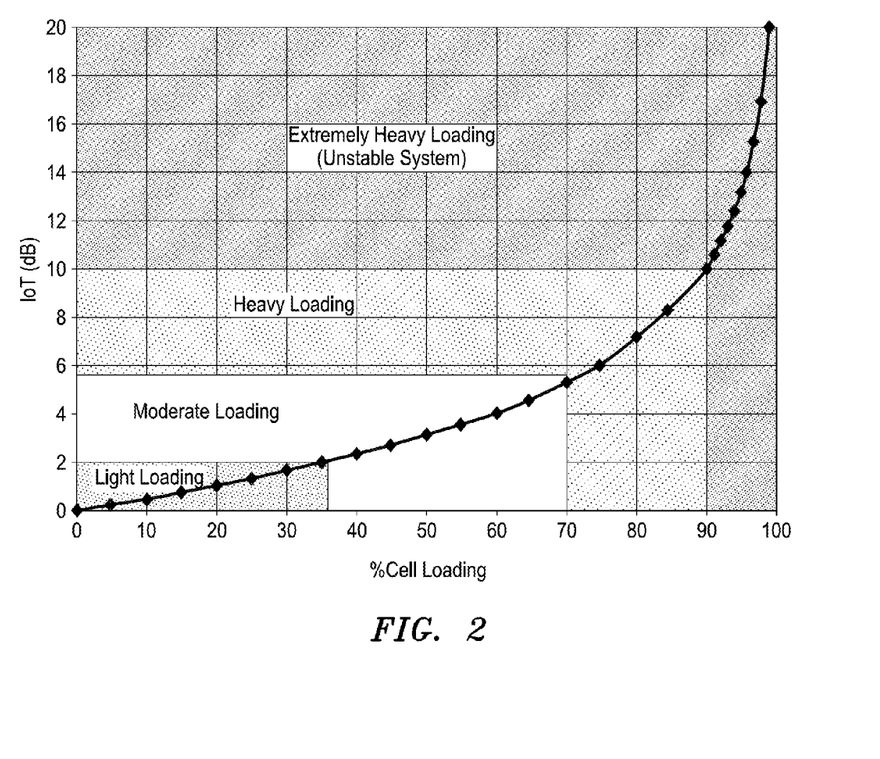
FIG. 2 is a plot showing how the target SINR for a given UE may be computed according to one example of FPC as conventionally practiced.

FIG. 2 is a plot showing how the target SINR for a given UE may be computed according to one example of FPC as conventionally practiced. It will be seen in the figure that the target SINR, as expressed in decibels, is permitted to vary between a maximum $\hat{\gamma}_{max}$ and a minimum $\hat{\gamma}_{min}$. Between those limits, the target SINR (in decibels) varies linearly with the path loss $\lambda$ for the given UE (also expressed in decibels). (The path loss is measurable at the NodeB using well-known techniques.) More specifically, the target SINR decreases linearly as the path loss increases, with a slope of $1-\alpha$. Hence, $\alpha$ defines the slope of the curve. For that reason, we refer to $\alpha$ as the "FPC slope parameter".

In other examples, the curve of target SINR versus path loss may decrease as a step function or another smooth or piecewise smooth nonlinear function.

The plot of FIG. 2 is represented by the following equation:

$$\hat{\gamma}(k,s) = \max\{\min[\hat{\gamma}_{max}(s), \hat{\gamma}_{max}(s) - (1-\alpha)\cdot(\lambda-\lambda_{NC}))], \hat{\gamma}_{min}\}.$$

As will be readily understood from the above equation, and as seen in FIG. 2, $\lambda_{NC}$ is the value of the path loss at the boundary between the constant near-cell portion of the target-SINR curve and the decreasing, linear portion. Likewise, it will be understood from the figure that $\lambda_{EC}$ is the value of the path loss at the boundary between the linear portion and the constant, edge-cell portion of the curve. "Near cell" refers to the region where the path loss is least, and "edge cell" refers to the region where the path loss is greatest.

According to the FPC technique, each sector forces the target SINR values of its UEs to a value dependent on the path loss. In particular, each sector limits the target SINR of its edge cell UEs to the minimum value $\hat{\gamma}_{min}$. In that manner, each sector controls the uplink transmit power levels of its own UEs, and concomitantly manages the interfering power that its UEs transmit to neighboring sectors.

It should be noted further that the FPC parameters, particularly $\hat{\gamma}_{max}$ and $\hat{\gamma}_{min}$, indirectly set limits for the spectral efficiency that will be feasible for the near cell and edge cell UEs, because the channel capacity (which determines spectral efficiency) depends on the SINR. The FPC parameters can have a significant effect on sector throughput and overall system performance, and hence also on the quality of the user experience. For example, if the target SINR remains too high at the cell edge, there will be too much interference in neighboring cells. On the other hand, if the target SINR drops off too rapidly with increasing path loss, the uplink may be lost and calls may consequently be dropped. For those and other reasons, it is advantageous for profitable operation of the network to set the FPC parameters as nearly optimally as possible.

For LTE networks, for example, power control on the PUSCH is described, e.g., in 3GPP standard publication TS 36.213, version 8.2.0, dated 2008-03. As described there, the update in the ith subframe of the PUSCH transmit power $P_{PUSCH}(i)$ depends on the current PUSCH power control adjustment state $f(i)$, which is set according to the difference between the measured SINR and the target SINR for each given UE and communicated from the base station to the UE. (The power control adjustment state $f(i)$ is typically the accumulated sum of the up/down power control commands, i.e., the TPC commands.)

More specifically, the transmit power (in dBm) is specified as, $$P_{PUSCH}(i) = \min\{P_{CMAX}, 10\log_{10}(M_{PUSCH}(i)) + P_{O\_PUSCH} + \alpha\cdot PL + \Delta_{TF}(i) + f(i)\},$$

where $P_{CMAX}$ is the UE maximum transmit power, $M_{PUSCH}(i)$ is the grant size, $P_{O\_PUSCH}$ is a power level given by the sum of two further quantities $P_{O\_NOMINAL\_PUSCH}$ and $P_{O\_UE\_PUSCH}$, PL is the downlink path loss estimated by the UE, and α is a cell-specific or sector-specific parameter, identical with the slope parameter discussed above, that is transmitted to the UE by the base station and that determines, in a direct sense, the sensitivity of the transmit power to the path loss.

$\Delta_{TF}(i)$ is a parameter related to the modulation and coding rate. The power-control adjustment state f(i) may be an accumulated power control command, or it may take the current power control value only. Each individual power control value includes a correction factor known as a TPC command. As is well known, the TPC command is a positive or negative step (in decibels) determined by the base station when it executes the inner power control loop. To choose the TPC, the NodeB typically compares the measured and target SINRs.

$P_{O\_NOMINAL\_PUSCH}$ is a cell-specific or sector-specific parameter calculated by each cell or sector and transmitted to the UEs by the base station. More specifically, it is the initial open-loop uplink power per PRB, as received at the base station. We further discuss $P_{O\_NOMINAL\_PUSCH}$ below.

$P_{O\_UE\_PUSCH}$ is a component of the total power level that is specific to each UE and is configured by the radio resource control (RRC).

As noted above, our new approach updates the FPC parameters dynamically, in response to changing interference conditions. Accordingly, in a first embodiment, each sector independently updates its FPC parameters based on a measured wideband IoT for that sector. IoT is typically measured at the NodeB. Advantageously, the value taken for the wideband IoT is a time-averaged value. For example, a running average may be computed by a single pole IIR filter having time constant β, according to the equation, $$IoT_{avg}(j,s) = (1-\beta)\cdot IoT_{avg}(j-1,s) + \beta \cdot IoT(j,s).$$

In each iteration of an update cycle, each sector selects an updated set of FPC parameters. In one exemplary approach, the parameters are selected by assigning the current interference condition to one of several categories according to its severity, and then selecting a particular set of parameters associated with the assigned category. One such example is illustrated by Table 1, in which three categories of FPC setting are provided, namely Aggressive, Moderate, and Conservative, which correspond, respectively, to light, moderate, and heavy interference conditions. Each of rows 1, 2, and 3 of the table is assigned a respective set of FPC parameters.

TABLE 1

| | Wideband IoT $IoT_{avg}^{dB} = 10 \cdot \log_{10}(IoT_{avg})$ | FPC Setting |
|---|---|---|
| 1 | 0-2 dB | Agressive |
| 2 | 2-5.5 dB | Moderate |
| 3 | >5.5 dB | Conservative |

Various individual parameters or combinations of parameters may be selectable. For example, any of the following parameter sets may be selectable: $\hat{\gamma}_{max}$ and $\hat{\gamma}_{min}$ only; α only; or $\hat{\gamma}_{max}$, $\hat{\gamma}_{min}$, and α.

Figure 3:
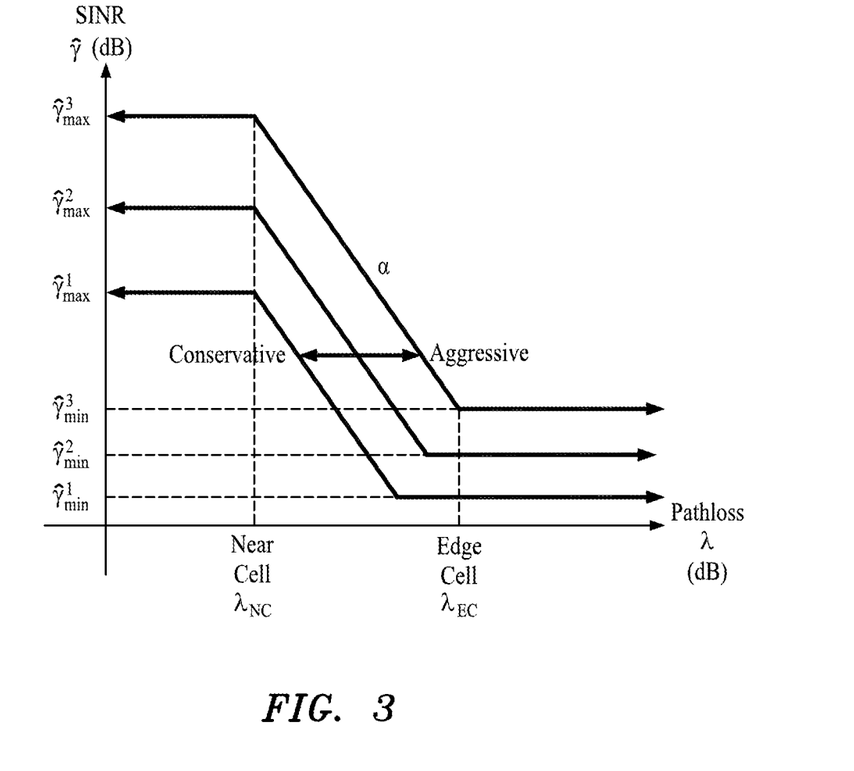
FIG. 3 is a plot of several curves of target SINR versus path loss, according to an embodiment of the present invention in which the selectable FPC parameters are $\hat{\gamma}_{max}$ and $\hat{\gamma}_{min}$.

FIG. 3 is a plot of several curves of target SINR versus path loss, for the case in which the selectable parameters are $\hat{\gamma}_{max}$ and $\hat{\gamma}_{min}$. Three curves are shown in the figure, corresponding to the Aggressive, Moderate, and Conservative cases referred to above. It will be seen that the intermediate portions of all three curves have the same slope, as indicated by the symbol α in the figure. (It will be recalled that in our terminology, the slope is defined by α, but its value is α−1.) However, with each successive increase in the severity of interference, the maximum and minimum target SINR values are decreased. It will be understood from the figure that each such decrease expands the range of path-loss values defining the set of UEs whose target SINR is fixed at the minimum level.

Figure 4:
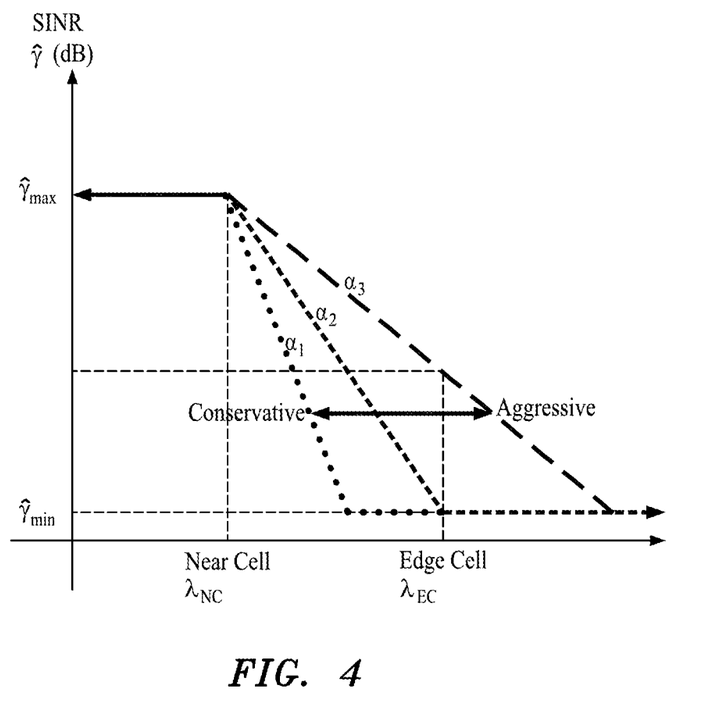
FIG. 4 is a plot of several curves of target SINR versus path loss, according to an embodiment of the present invention in which the selectable FPC parameter is $\alpha$ only.

FIG. 4, by contrast, is a plot of several curves of target SINR versus path loss, for the case in which the selectable parameter is α only. The three illustrated curves again correspond to the Aggressive, Moderate, and Conservative cases referred to above. It will be seen that the intermediate portions of each curve has a different slope, respectively indicated by the symbol $α_1$, $α_2$, or $α_3$. On the other hand, $\hat{\gamma}_{max}$ and $\hat{\gamma}_{min}$ are the same for each of the three curves. It will be understood from the figure that each increase in the slope expands the range of path-loss values defining the set of UEs whose target SINR is fixed at the minimum level.

It should be noted in this regard that in LTE, changes in the slope parameter α must be communicated as a System Information (SI) change by the base station to both the idle UEs and the active UEs within the sector. Specifically, in accordance with the standard 3GPP TS 36.331, an updated value of α would be communicated to the UEs in the uplinkPowerControlCommon field of an SI message, and notice to the UEs of the change in SI would be communicated in the information tag systemInfoValueTag in a System Information Block broadcast to the UEs.

On the other hand, changes in $\hat{\gamma}_{max}$ and $\hat{\gamma}_{min}$ are made locally, i.e., within the cell, and they do not need to be communicated to the UEs. To conserve signaling overhead, therefore, it may be advantageous to make $\hat{\gamma}_{max}$ and $\hat{\gamma}_{min}$ selectable without making α selectable.

There will be a critical level $\gamma_{Critical}$ of the SINR on the uplink PUSCH that must be maintained, particularly for the edge cell UEs, in order to avoid failure of the uplink while the FPC parameters are being changed. (This may be especially important, e.g., when changing from the Aggressive parameter set to the Conservative parameter set.) In one example, the critical value may be taken to be the minimum SINR required to decode UL PUSCH transmissions using Modulation and Coding Scheme (MCS) 0 with an initial block error rate of, e.g., 1%. Alternatively, a value for the critical SINR may be derived from the minimum uplink PUSCH throughput requirement.

One way to maintain the SINR on the uplink PUSCH at or above the critical level is by controlling $P_{O\_NOMINAL\_PUSCH}$ together with the FPC parameters. For example, each cell or sector may perform a cell-specific or sector-specific calculation of that depends, among other factors, on the slope parameter α, on $\gamma_{Critical}$, and on $IoT_{avg}$. One exemplary such calculation is performed according to the equation, $$P_{O\_NOMINAL\_PUSCH} = \gamma_{Critical} + (1-\alpha)\cdot\lambda_{EC} + 10\cdot\log_{10}(IoT_{avg}\cdot M\cdot n_p).$$

As described above in regard to the updates of α in an LTE network, the cell or sector updates $P_{O\_NOMINAL\_PUSCH}$ by updating systemInfoValueTag in a System Information Block message and including the updated information in uplinkPowerControlCommon as specified in 3GPP TS 36.331.

In at least some implementations, it may also be advantageous to adjust the parameter $P_{0\_nominal\_rach}$ in response to the IoT measurements. $P_{0\_nominal\_rach}$ is the basic unit of preamble transmission power on the PRACH, i.e., the physical random access channel according to the 3GPP specification. PRACH is used as an access channel in LTE networks. It carries preambles, which are orthogonal sequences selected by the UEs and used by them to gain access to the NodeB. More specifically, the NodeB measures the SINR in a preamble transmitted on the uplink, and on that basis may grant access to the transmitting UE. If access is granted, the UE may then migrate to the common and dedicated control channels and then to the traffic channels.

The power control mechanism for PRACH is open loop. For a given UE, an initial power level is determined based on the SINR from the NodeB and on the IoT. The preamble power level is then increased by degrees until the preamble is acknowledged by the NodeB.

It could be advantageous to control $P_{0\_nominal\_rach}$ such that in low loading scenarios, i.e., when IoT measurements are relatively low, the initial transmission power of the UE for the RACH preamble is also relatively low. On the other hand, when IoT measurements are higher, $P_{0\_nominal\_rach}$ may be increased to increase the success rate for preambles to be detected by the NodeB and to reduce latency under high loading conditions.

The signaling required to adjust $P_{0\_nominal\_rach}$ as described above is analogous to that used for the adjustments to $P_{O\_NOMINAL\_PUSCH}$ described above. In fact, the PUSCH updates and the PRACH updates can be broadcast simultaneously to the UEs to avoid additional signaling overhead.

The Physical Uplink Control Channel (PUCCH) is used in LTE networks to carry control information, including acknowledgement (ACK/NACK) of data packets received on the downlink, channel quality indications (CQI), scheduling requests, and (for MIMO implementations) precoding matrix information and rank indications. Open-loop power control on the PUCCH is very similar to power control on the PRACH. Accordingly the principles described above in regard to the PRACH are readily applied to the PUCCH as well. Thus, it could be advantageous to control a nominal transmit power level for the PUCCH such that in low loading scenarios, i.e., when IoT measurements are relatively low, the initial transmission power of the UE for the PUCCH is also relatively low. On the other hand, when IoT measurements are higher, the nominal power level may be increased to increase the success rate for control signals to be detected by the NodeB. The signaling required to update the PUCCH nominal power level is similar to that described above. Thus, the PUCCH updates may be broadcast simultaneously with the PUSCH and PRACH updates to avoid additional signaling overhead.

In the embodiment described above, each sector individually changes its own FPC parameters based on its measurement of the wideband IoT from the neighboring sectors. However, there may also be occasions in which even better system performance can be obtained when each sector explicitly considers the interference suffered by its neighbors.

Accordingly, a second embodiment acts to control the contribution that each sector makes to the interference in its neighboring sectors. For example, a given sector might set its FPC parameters conservatively if there are many active cell-edge UEs. Similarly, a sector in which there are many handovers or other activities related to high mobility might choose conservative FPC parameters because increases in such activities tend to increase the contribution to IoT in neighboring sectors.

Higher IoT experienced, in turn, by neighboring sectors tends to drive up the transmit power of UEs that are active within such sectors due to the reaction of the closed-loop power control to the increased interference level. One possible consequence is a chain reaction leading to a system-wide rise in IoT. The possibility of avoiding such an outcome is one reason why it may be desirable for each sector to manage its interference contribution to its neighboring sectors.

Accordingly, each sector may advantageously monitor its population of edge cell UEs and, e.g., its handover activities continuously or on a repetitive cycle. An interference figure is computed according to an appropriate formula and updated periodically. An appropriate formula may include, for example, a time-averaged count of the edge-cell UEs. It may also include an indication of handover activities in the form, for example, of a time-averaged count of the number of UEs entering or leaving the sector. Such a count could be based, for example, on path-loss measurements.

In each iteration of an update cycle, each sector selects an updated set of FPC parameters. In one exemplary approach (similar to that described above in regard to the first embodiment), the parameters are selected by assigning the current interference condition to one of several categories according to its severity, and then selecting a particular set of parameters associated with the assigned category. A look-up table for such purpose may be constructed, for example, from the results of system-level simulations.

The system-level simulations may be performed for different distributions of UEs within the sectors (including, e.g., the fraction of active UEs in each sector that are near the cell edge) in combination with different sets of handover statistics (including, e.g., the number of handovers into and out of a given sector per unit time).

One such example is illustrated by Table 2, in which three categories of FPC setting are provided, namely Aggressive, Moderate, and Conservative, which correspond, respectively, to light, moderate, and heavy interference conditions. Each of rows 1, 2, and 3 of the table is assigned a respective set of FPC parameters.

TABLE 2

| | Edge Cell Activity Measure | FPC Setting |
|---|---|---|
| 1 | Low | Agressive |
| 2 | Medium | Moderate |
| 3 | High | Conservative |

It often happens that there is overlap between the antenna patterns of adjacent cells, or of adjacent sectors that are served by the same base station, which leads to undesired interaction across cell or sector boundaries. Consequently, it would be advantageous for each sector to identify, among its own served UEs, those which are most likely to interfere with neighboring sectors, and to apply more conservative FPC parameters to those particular UEs. Such an approach may be included, for example, in either of the embodiments described above.

For example, the UEs of 3GPP networks are configured to measure reference symbol receive power (RSRP) from their own and from neighboring NodeBs. Under the current 3GPP standard, a given sector can also configure its UEs to report the RSRPs measured from neighboring sectors. The NodeB receiving these reports can readily identify the probable interferors, i.e. those UEs most likely to have the strongest interactions with the neighboring cells. By using, e.g., the control messages described above, the sector can decrease the target SINR for those UEs that are probable interferors. By operation of the power-control loop, those UEs having low target SINRs will also have relatively low transmission power.

One way to reduce the target SINR for an individual UE is to fix it at the minimum value $\hat{\gamma}_{min}$. Another way, which is path-loss dependent, is to impose on that particular UE a conservative setting for $\alpha$ and/or for $\hat{\gamma}_{max}$ and $\hat{\gamma}_{min}$, irrespective of the IoT of the sector.

Figure 5:
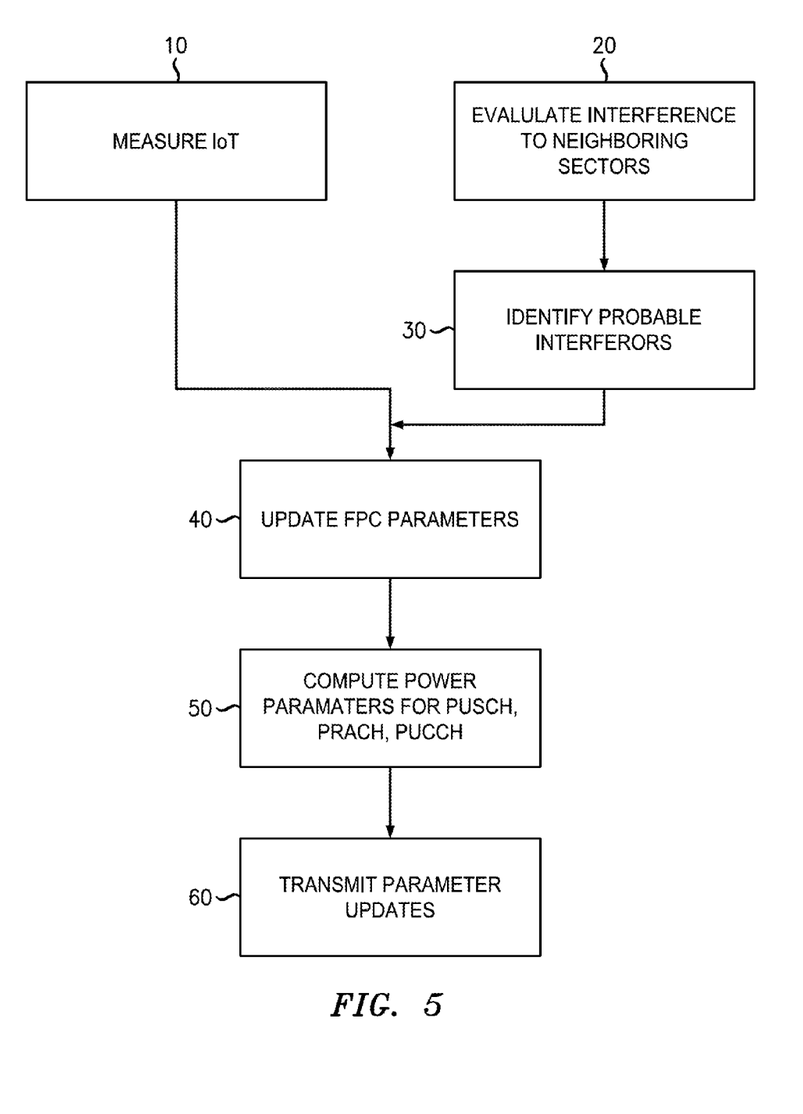
FIG. 5 is a flowchart that summarizes several exemplary embodiments of the invention.

The various embodiments described above are summarized in FIG. 5. As seen in the figure, the sector measures its IoT at block 10, and, optionally or alternatively, it evaluates interference effects on the neighbor cells at block 20 and identifies those UEs that are probably interferors at block 30. At block 40, the FPC parameters are updated in accordance with the various interference measurements. At block 50, power parameters as discussed above are optionally computed for uplink channels such as PUSCH, PRACH, and PUCCH. At block 60, the sector transmits the updated FPC parameters and uplink power parameters to the UEs.

The invention claimed is:

1. A method of uplink power control in a wireless network, of the kind in which a target signal-to-interference-and-noise ratio (target SINR) $\hat{y}(k,s)$ for a UE k in a sector s, wherein k and s are positive integer indices, depends on a path loss $\lambda(k,s)$ between UE k and a NodeB serving sector s and is governed at least in part by a maximum SINR target $\hat{y}_{max}$, a minimum SINR target $\hat{y}_{min}$, and a parameter α that determines how rapidly the target SINR will vary with path loss over a range spanning at least some path loss values, comprising:

obtaining a current value of a time-varying uplink interference figure for at least one individual sector s;

assigning, for at least one of the at least one individual sector s, the respective current value to a corresponding category of a plurality of categories, each of the plurality of categories being associated with a determined severity of a current interference condition, each of the plurality of categories being associated with a respective predetermined value for at least one of $\hat{y}_{max}$, $\hat{y}_{min}$, and α; and for at least one of the at least one individual sector s, selecting the respective predetermined value for at least one of $\hat{y}_{max}$, $\hat{y}_{min}$, and α corresponding to the assigned corresponding category of the plurality of categories to determine a dependency of $\hat{y}(k,s)$ on the path loss $\lambda(k,s)$ for at least some UEs k in sector s.

2. The method of claim 1, wherein the selection of a value for at least one of $\hat{y}_{max}$, $\hat{y}_{min}$, and α determines a dependency of $\hat{y}(k,s)$ on the path loss $\lambda(k,s)$ for each UE k in sector s for which $\hat{y}(k,s)$ falls between $\hat{y}_{max}$ and $\hat{y}_{min}$.

3. The method of claim 1, wherein the selecting step comprises selecting values for $\hat{y}_{max}$ and $\hat{y}_{min}$.

4. The method of claim 1, wherein the selecting step comprises selecting a value for α.

5. The method of claim 4, further comprising signaling an updated value of α to the UEs in sector s.

6. The method of claim 1, wherein the selecting step comprises mapping the current value of the time-varying uplink interference figure to the selected predetermined value or predetermined values according to a specified range within which the current value of the time-varying uplink interference figure falls.

7. The method of claim 1, wherein $\hat{y}(k,s)$, as expressed in decibels, depends linearly on $\lambda(k,s)$, as expressed in decibels, over a range between $\hat{y}_{max}$ and $\hat{y}_{min}$, and the linear dependence has a slope defined by α.

8. The method of claim 1, wherein sector s has a physical uplink shared channel PUSCH and an initial open-loop uplink power parameter $P_{O\_NOMINAL\_PUSCH}$ for said channel, and the method further comprises updating $P_{O\_NOMINAL\_PUSCH}$ in response to the obtaining of the current value of the time-varying uplink interference figure, such that the updated $P_{O\_NOMINAL\_PUSCH}$ is dependent on the current value of the time-varying uplink interference figure.

9. The method of claim 1, wherein sector s has a physical random access channel PRACH and a power parameter $P_{O\_nominal\_rach}$ for preambles transmitted on said channel, and the method further comprises updating $P_{O\_nominal\_rach}$ in response to the obtaining of the current value of the time-varying uplink interference figure, such that the updated $P_{O\_nominal\_rach}$ is dependent on the current value of the time-varying uplink interference figure.

10. The method of claim 1, wherein sector s has a physical uplink control channel PUCCH and a power parameter for uplink transmissions on said channel, and the method further comprises updating said power parameter in response to the obtaining of the current value of the time-varying uplink interference figure, such that the updated power parameter is dependent on the current value of the time-varying uplink interference figure.

11. The method of claim 1, further comprising, for at least one said individual sector s, defining one or more UEs of sector s as probable interferors, and performing an action that reduces the target SINRs of the probable interferors.

12. The method of claim 11, wherein said action comprises updating at least one of $\hat{y}_{max}$, $\hat{y}_{min}$, and α.

13. The method of claim 11, wherein said action comprises setting the target SINR of at least one of the probable interferors to $\hat{y}_{min}$.

14. The method of claim 1, wherein the current value of the time-varying uplink interference figure characterizes uplink interference within sector s due to transmissions from other sectors.

15. The method of claim 14, wherein the current value of the time-varying uplink interference figure is a wideband interference over thermal (wideband IoT).

16. The method of claim 15, wherein the current value of the time-variable interference figure is a moving average of the wideband IoT.

17. The method of claim 16, wherein the obtaining step comprises updating the current value of the time-varying uplink interference figure to obtain a current value of the moving average.

18. The method of claim 16, wherein the selecting step comprises identifying a range within which the moving average of wideband IoT falls, and mapping the identified range to a respective predetermined value of at least one of $\hat{y}_{max}$, $\hat{y}_{min}$, and α.

19. The method of claim 1, wherein the current value of the time-varying uplink interference figure characterizes uplink interference in other sectors due to transmissions from sector s.

20. The method of claim 19, wherein the current value of the time-varying uplink interference figure characterizes the number of UEs in sector s that are active and at the cell edge.

21. The method of claim 19, wherein the current value of the time-varying uplink interference figure characterizes a handover frequency for UEs in sector s.

* * * * *